US011384633B2

(12) United States Patent
Gonzalez et al.

(10) Patent No.: US 11,384,633 B2
(45) Date of Patent: Jul. 12, 2022

(54) DRILL HEAD POSITION DETERMINATION SYSTEM (71) Applicant: Caterpillar Global Mining Equipment LLC, Denison, TX (US)

(72) Inventors: Fernando R. Gonzalez, Nuevo Leon (MX); Rex Glover, Deer Creek, IL (US); Stephen M. Hancock, Van Alstyne, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 83 days.

(21) Appl. No.: 16/417,188

(22) Filed: May 20, 2019

(65) Prior Publication Data
US 2020/0370420 A1 Nov. 26, 2020

(51) Int. Cl.
*E21B 44/00* (2006.01)
*G01B 21/00* (2006.01)
*E21B 3/02* (2006.01)
*G01B 7/00* (2006.01)
*E21B 47/09* (2012.01)
*E21B 49/00* (2006.01)
*E21B 47/13* (2012.01)

(52) U.S. Cl.
CPC ............... *E21B 47/09* (2013.01); *E21B 3/02* (2013.01); *E21B 3/022* (2020.05); *E21B 44/00* (2013.01); *E21B 47/13* (2020.05); *E21B 49/003* (2013.01); *G01B 7/003* (2013.01); *G01B 21/00* (2013.01)

(58) Field of Classification Search
CPC .......... E21B 47/09; E21B 44/00; E21B 3/022; G01B 21/00; G01B 7/003
See application file for complete search history.

(56) References Cited

U.S. PATENT DOCUMENTS

| | | | | |
|---|---|---|---|---|
| 4,114,435 A | * | 9/1978 | Patton | E21B 45/00 702/9 |
| 4,616,321 A | * | 10/1986 | Chan | E21B 45/00 702/9 |
| 4,951,505 A | * | 8/1990 | Seiler | E21B 45/00 73/152.45 |
| 5,107,705 A | * | 4/1992 | Wraight | E21B 45/00 73/152.03 |

(Continued)

FOREIGN PATENT DOCUMENTS

| | | | |
|---|---|---|---|
| CN | 102788568 A | * | 11/2012 |
| CN | 203869676 U | * | 10/2014 |

(Continued)

*Primary Examiner* — Blake Michener
*Assistant Examiner* — Theodore N Yao
(74) *Attorney, Agent, or Firm* — Bookoff McAndrews PLLC (57) ABSTRACT

A drill head position determination system may include a mast, a drill head movably attached to the mast, and a drill drive assembly configured to move the drill head up and down along a length of the mast. The drill head may be configured to rotate a drill string. The drill drive assembly may include at least one sheave and a cable system wound about the at least one sheave. The drill head position determination system may further include a sheave sensor operatively coupled to the at least one sheave and configured to determine a position of the drill head based on a measured rotational position of the at least one sheave.

20 Claims, 5 Drawing Sheets

(56) References Cited

U.S. PATENT DOCUMENTS

| | | | | |
|---|---|---|---|---|
| 5,342,020 | A * | 8/1994 | Stone | B66D 1/485 |
| | | | | 254/269 |
| 6,092,610 | A | 7/2000 | Kosmala et al. | |
| 6,556,153 | B1 * | 4/2003 | Cardamone | G01D 5/24404 |
| | | | | 341/111 |
| 7,940,041 | B2 * | 5/2011 | Waters | G01D 5/2515 |
| | | | | 324/207.25 |
| 8,497,685 | B2 | 7/2013 | Sugiura | |
| 9,097,109 | B2 | 8/2015 | Boekholtz et al. | |
| 2014/0338975 | A1 * | 11/2014 | Hoult | E21B 47/024 |
| | | | | 175/40 |
| 2017/0362905 | A1 * | 12/2017 | Mailly | G06K 9/6269 |
| 2018/0038984 | A1 | 2/2018 | Zhang et al. | |
| 2018/0238162 | A1 * | 8/2018 | Jeffryes | E21B 44/02 |
| 2020/0224523 | A1 * | 7/2020 | Parmeshwar | E21B 44/00 |

FOREIGN PATENT DOCUMENTS

| | | |
|---|---|---|
| CN | 106437684 A | 2/2017 |
| WO | 2014/078880 A1 | 5/2014 |

* cited by examiner

DRILL HEAD POSITION DETERMINATION SYSTEM

TECHNICAL FIELD

The present disclosure relates generally to drilling machines, and more particularly, to a drill head position determination system for such machines.

BACKGROUND

Drilling machines, such as blasthole drilling machines, are typically used for drilling blastholes for mining, quarrying, dam construction, and road construction, among other uses. The process of excavating rock, or other material, by blasthole drilling comprises using the blasthole drill machine to drill a plurality of holes into the rock and filling the holes with explosives. The explosives are detonated causing the rock to collapse and rubble of the collapse is then removed and the new surface that is formed is reinforced. Many current blasthole drilling machines utilize rotary drill rigs, mounted on a mast, that can drill blastholes anywhere from 6 inches to 22 inches in diameter and depths up to 180 feet or more. For example, a drill head of the drilling machine is configured to rotate a drill sting coupled to a drill tool for drilling into the ground surface. A pulley system having a cable operatively coupled to the drill head may drive the drill head up and down a mast of the drilling machine.

Further, an operator may need to know a position of the drill head on the mast in order to perform various functions of the drilling operation. For example, the operator may need to know when the drill head is at a certain position on the mast for coupling or decoupling a drill pipe to the drill head. Such information may also enable the controller to automatically perform the various functions of the drilling operation. However, current systems for determining the position of the drill head may provide inaccurate position information due to slippage or jumping of the cable on the pulley system.

U.S. Pat. No. 7,940,041, issued to Waters et al. on May 10, 2011 ("the '041 patent"), describes a method of determining the amount of travel of a rotating component that includes providing a self-contained magnetically-powered encoder. The encoder of the '041 patent is rotatably coupled to a drive shaft of a drum of a pulley system that is powered by a power source. The encoder transmits data to a monitoring system that correlates rotation of the drum to a depth of the drill pipe. However, the '041 patent does not disclose that the encoder sensor accounts for inaccuracies of the position information of the drill head.

The systems and methods of the present disclosure may address or solve one or more of the problems set forth above and/or other problems in the art. The scope of the current disclosure, however, is defined by the attached claims, and not by the ability to solve any specific problem.

SUMMARY

In one aspect, a drill head position determination system is disclosed. The drill head position determination system may include: a mast; a drill head movably attached to the mast, the drill head configured to rotate a drill string; a drill drive assembly configured to move the drill head up and down along a length of the mast, the drill drive assembly including: at least one sheave; and a cable system wound about the at least one sheave; and a sheave sensor operatively coupled to the at least one sheave and configured to determine a position of the drill head based on a measured rotational position of the at least one sheave.

In another aspect, a drill head position determination system is disclosed. The drill head position determination system may include: a mast; a drill head movably attached to the mast, the drill head configured to rotate a drill string; a drill drive assembly configured to move the drill head up and down along a length of the mast, the drill drive assembly including: at least one sheave; and a cable system wound about the at least one sheave; a sheave sensor operatively coupled to the at least one sheave and configured to determine a position of the drill head based on a measured rotational position of the at least one sheave; and a plurality of proximity sensors each located at a different position on the mast and each configured to detect when the drill head is at a respective position on the mast.

In yet another aspect, a method for determining a position of a drill head is disclosed. The method may include: measuring a rotational position of a sheave using a sheave sensor; detecting a position of the drill head using at least one proximity sensor located at a position on the mast; and calibrating the sheave sensor based on a triggering of the at least one proximity sensor.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
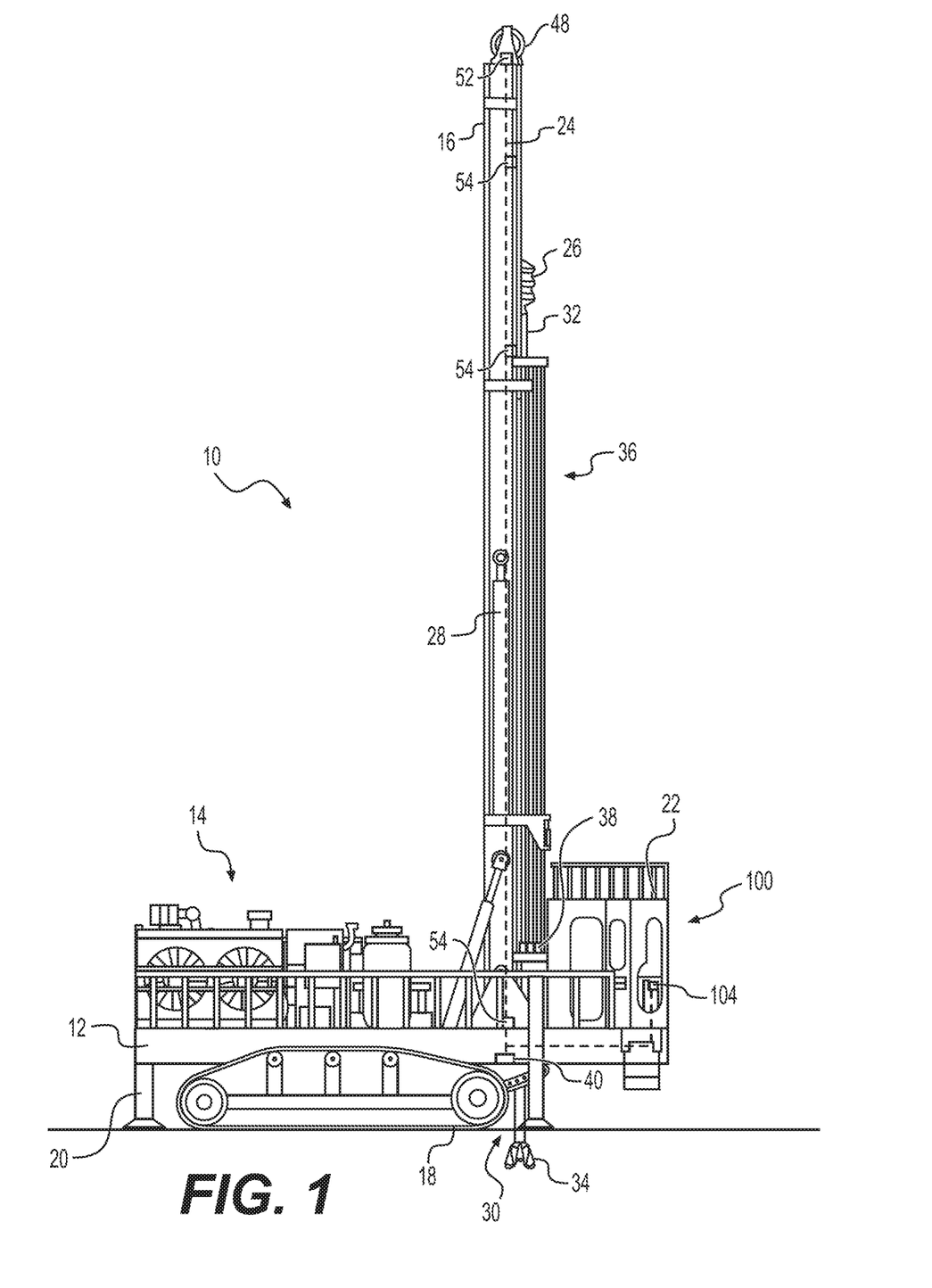
FIG. 1 illustrates a side view of an exemplary drilling machine, according to aspects of the disclosure.

FIG. 1 illustrates a side view of an exemplary drilling machine 10, such as a blasthole drilling machine, having a drill head position determination system 100 according to aspects of the disclosure. As shown in FIG. 1, drilling machine 10 may include a frame 12, machinery 14, and a mast 16. Frame 12 may be supported on a ground surface by a transport mechanism, such as crawler tracks 18. Crawler tracks 18 may allow drilling machine 10 to maneuver about the ground surface to a desired location for a drilling operation. Frame 12 may further include one or more jacks 20 for supporting and leveling drilling machine 10 on the ground surface during the drilling operation. Frame 12 may support the machinery 14, which may include engines, motors, batteries, pumps, air compressors, a hydraulic fluid source, and/or any other equipment necessary to power and operate drilling machine 10. Frame 12 may further support an operator cab 22, from which a user, or operator, may maneuver and control drilling machine 10.

Figure 2:
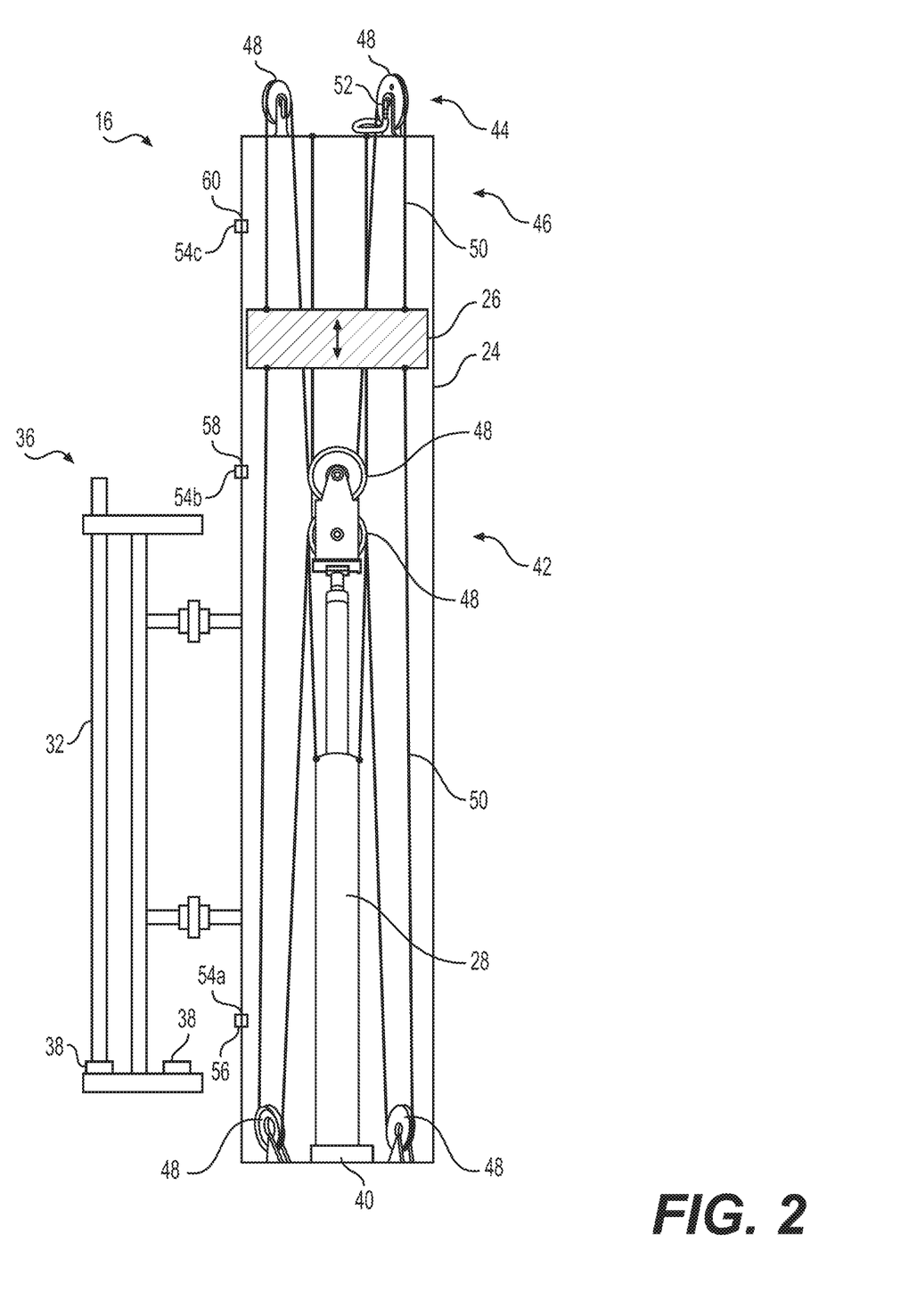
FIG. 2 illustrates a front, explanatory schematic view of an exemplary mast isolated from the drilling machine of FIG. 1.

As further shown in FIG. 1, mast 16 may include a mast frame 24 that may support a drill motor assembly, or drill head 26, movably mounted on the mast frame 24. For example, drill head 26 may be operatively coupled to a drill drive assembly 42 (as shown in FIG. 2) and controlled by a hydraulic cylinder 28 (located within mast frame 24) for moving drill head 26 up and down along mast frame 24, as detailed further below. Drill head 26 may couple to, and may be controllable to rotate, a drill string 30 of one or more drill pipes 32. A drill tool, such as a drill bit 34, may be mounted at a bottom end of drill string 30 for drilling into the ground surface. It is understood that drill head 26 may be any type of drill head, such as a fluid motor-type hydraulic rotary head or the like and drill bit 34 may be any type of drill tool, such as a hammer or the like. Mast 16 may further include a sheave sensor 52 and at least one proximity sensor 54 (shown schematically in FIG. 1) in communication with a controller 104 for determining a position of drill head 26 on mast frame 24, as detailed further below.

Mast frame 24 may also support a drill pipe rack 36 and a deck wrench 40 (shown schematically in FIG. 1). Drill pipe rack 36 may store one or more drill components, such as drill pipes 32, in one or more slots or cups 38 to hold and provide the drill components (e.g., drill pipes 32) during the drilling operation. Drill pipe rack 36 may be pivotably connected to mast frame 24 such that drill pipe rack 36 may pivot into mast frame 24 for adding or removing dill pipes 32 to drill string 30. Deck wrench 40 may be located on a bottom deck (not shown) of mast frame 24 and may include a claw-like shape corresponding to a shape of drill pipes 32 for holding drill pipes 32 and/or drill bit 34.

FIG. 2 illustrates a front, explanatory schematic view of mast 16 of drilling machine 10, with drill pipe rack 36 in a withdrawn position. As shown in FIG. 2, mast 16 may include a drill drive assembly 42 for driving drill head 26 (shown schematically as merely a rectangle in FIG. 2) up and down along a length of mast frame 24 (as indicated by the arrow on drill head 26). Drill drive assembly 42 may include a sheave assembly 44, a cable system 46, and hydraulic cylinder 28. Sheave assembly 44 may include at least one sheave 48. Cable system 46 may include at least one cable 50 wound about the at least one sheave 48. In one embodiment, sheave assembly 44 may include a plurality of sheaves 48 and cable system 46 may include a plurality of cables 50 wound about the plurality of sheaves 48. Hydraulic cylinder 28 may include at least one sheave 48 such that when hydraulic cylinder 28 is extended, hydraulic cylinder 28 may exert a force (e.g., a pull-down force) on drill head 26 (via cable system 46) for pulling-down drill head 26 along mast frame 24. Likewise, when hydraulic cylinder 28 is retracted, hydraulic cylinder 28 may exert a force (via cable system 46) on drill head 26 for hoisting up drill head 26 along mast frame 24. During such movement of drill head 26, sheaves 48 may rotate due to cable 50 being moved (to pull-down or hoist up drill head 26) as hydraulic cylinder 28 is extended or retracted. Thus, rotation of sheaves 48 may correspond to movement of drill head 26 on mast frame 24.

As further shown in FIG. 2, sheave sensor 52 may be operatively associated with the at least one sheave 48. In one embodiment, sheave sensor 52 may be operatively associated with a sheave 48 located on a top end of mast 16. However, sheave sensor 52 may be operatively associated with any of the plurality of sheaves 48. Sheave sensor 52 may measure a rotational position of the at least one sheave 48, as detailed further below. Further, the at least one proximity sensor 54 may be located at a position on mast 16 and may be configured to detect when drill head 26 is at the position on mast 16. In one embodiment, the at least one proximity sensor 54 may include a plurality of proximity sensors 54a-54c each located at a different position on mast 16. For example, the plurality of proximity sensors 54a-54c may include a first proximity sensor 54a located at a first position 56, a second proximity sensor 54b located at a second position 58, and a third proximity sensor 54c located at a third position 60.

First position 56 on mast 16 may correspond to a position of drill head 26 for engagement of a drill pipe 32 secured by deck wrench 40 of mast 16. For example, deck wrench 40 may secure a drill pipe 32 at a bottom end of mast 16. Drill head 26 may be lowered to the first position 56 on mast 16 to engage drill pipe 32 at deck wrench 40. As used herein, "engage," or "engagement," is when drill head 26 (or a drill pipe connected to drill head 26) is in contact with a drill pipe 32, but not fully (rotationally) secured to drill pipe 32. First position 56 may also correspond to a position of drill head 26 for extending deck wrench 40 to hold a drill pipe 32 connected to drill head 26 for decoupling the drill pipe 32 from drill head 26 at deck wrench 40. Thus, first proximity sensor 54a may detect when drill head 26 is at the first position 56.

Second position 58 on mast 16 may correspond to a position where drill head 26 is moved beyond (above) drill pipe rack 36. For example, during the drilling operation, drill head 26 may be raised to the second position 58 such that drill head 26 is at a position where it will not interfere with drill pipe rack 36 when drill pipe rack 36 is pivoted into mast frame 24. As such, drill pipe rack 36 may be pivoted into mast frame 24 such that drill head 26 may be lowered to place drill pipe 32 into a slot 38. Thus, second proximity sensor 54b may detect when drill head 26 is at the second position 58.

Third position 60 on mast 16 may correspond to when drill bit 34, coupled to drill string 30, is completely out of the ground surface. For example, at the end of the drilling operation, drill head 26 may be raised to the third position 60 in order to raise drill bit 34 out of the ground surface. Thus, third proximity sensor 54c may detect when drill head 26 is at the third position 60.

Figure 3:
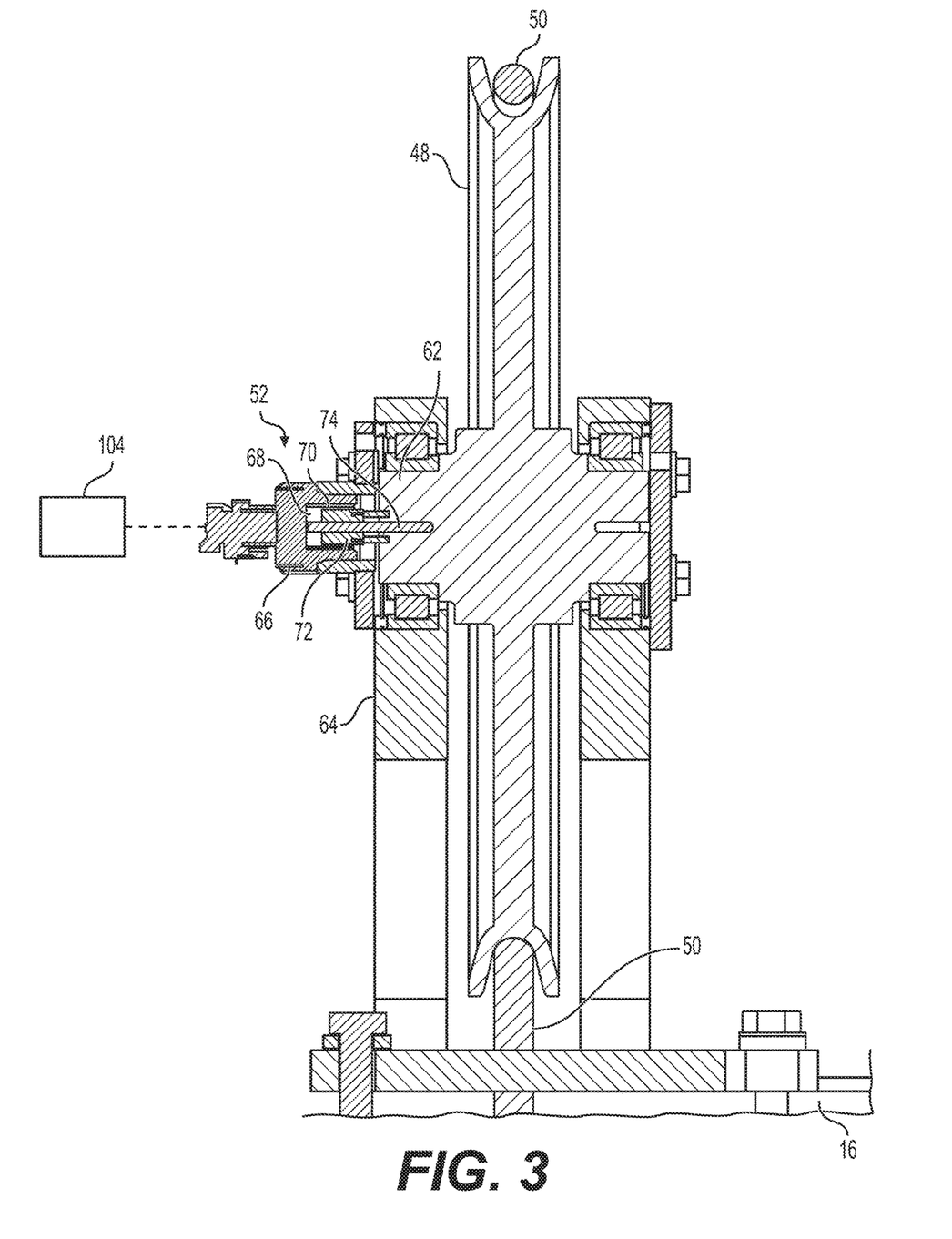
FIG. 3 illustrates a front cross-sectional view of a sheave sensor operatively coupled to a sheave of the drilling machine of FIG. 1.

FIG. 3 illustrates a front cross-sectional view of sheave sensor 52 operatively coupled to a sheave 48 of drilling machine 10. As shown in FIG. 3, sheave 48 may include a sheave shaft 62. Sheave 48 may be rotatably coupled in a bracket 64 of mast 16. For example, sheave shaft 62 may be inserted into corresponding holes of bracket 64 such that sheave 48 rotates within bracket 64 as cable 50 moves drill head 26 along mast 16.

Sheave sensor 52 may include an encoder sensor, such as a rotary encoder or the like. For example, sheave sensor 52 may include an encoder 66 having a circular bore 68 therein such that bore 68 defines an inner diameter of encoder 66. One or more stationary elements 70 may be rigidly connected to encoder 66 and configured to sense a relative rotational movement of sheave 48 (e.g., via sheave shaft 62). The one or more stationary elements 70 may be magnetic or optical elements mounted inside encoder 66 around a circumference of bore 68 and configured to detect a rotation of an indexing element 72 connected to rotate with sheave shaft 62. Indexing element 72 may include, for example, a magnet, a toothed tone wheel, a calibration stripe, teeth of a timing gear, or any other indexing element known in the art. A rod member 74 may be coupled to indexing element 72 and coupled to sheave 48. For example, rod member 74 may be coupled to sheave shaft 62 such that rod member 74 rotates indexing member 72 inside encoder 66 when sheave 48 rotates. In one embodiment, indexing element 72 may include a magnet having a series of magnetic poles (e.g., two or more). For example, a sensor of the one or more stationary elements 70 may detect a change in magnetic field as the indexing element 72 (e.g., the magnet) rotates within encoder 66. The sensor may be configured to generate a signal each time indexing element 72 (or a portion thereof) passes near the one or more stationary elements 70. The signal may indicate a rotational position of sheave shaft 62, as further detailed below. Thus, sheave sensor 52 may measure a rotational position of sheave 48. It is understood that sheave sensor 52 may be any type of sensor for measuring a rotational position of sheave 48 including, for example, optical sensors, resistance sensors, conductive sensors, or the like. Further, sheave sensor 52 may send the rotational position signal to controller 104, as further detailed below.

Figure 4:
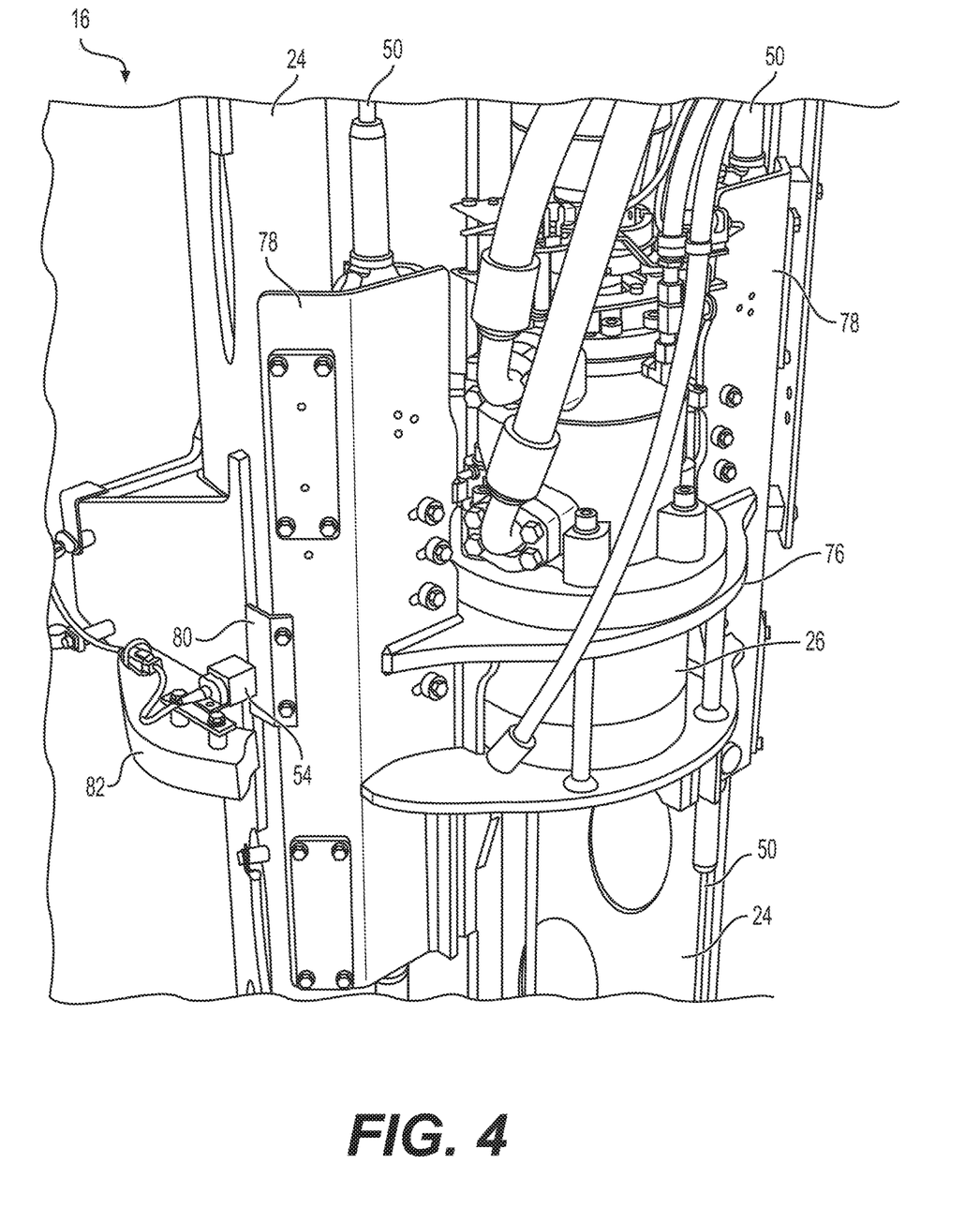
FIG. 4 illustrates a front perspective view of the mast of FIG. 2, having a proximity sensor mounted thereon.

FIG. 4 illustrates a front perspective view of mast 16 having a proximity sensor 54 coupled thereon. As shown in FIG. 4, drill head 26 may be mounted on a support structure 76 that is slidably coupled to mast frame 24. For example, support structure 76 may include a pair of guide assemblies 78 for engaging mast frame 24. The at least one cable 50 may be coupled to support structure 76 at each of the guide assemblies 78 such that drill drive assembly 42 may move support structure 76 up and down along mast frame 24. Thus, drill head 26 may move up and down along mast 16. Support structure 76 may further include a target plate 80 coupled thereto. For example, target plate 80 may be coupled to one of the guide assemblies 78 such that target plate 80 extends beyond an outer edge of the guide assembly 78. Target plate 80 may be coupled to guide assembly 78 by any means known in the art, such as by a nut and bolt connection, welding, or the like. In some embodiments, target plate 80 may be formed with guide assembly 78 such that guide assembly 78 and target plate 80 form a singular part. In one embodiment, target plate 80 may be rectangular shaped and made of metal. However, it is understood that target plate 80 may be any shape and may be made of any type of material, such as plastic or the like.

As further shown in FIG. 4, proximity sensor 54 may be coupled to mast 16 such that proximity sensor 54 is directed at target plate 80 when drill head 26 is moved to the position (e.g., first, second, and/or third position 56, 58, 60) of proximity sensor 54. For example, sensor may be aligned such that target plate 80 passes in front of proximity sensor 54 when drill head 26 is at the position of proximity sensor 54. In one embodiment, proximity sensor 54 may be coupled to a mounting bracket 82 of mast 16. However, proximity sensor 54 may be coupled directly to mast 16 by any means known in the art, such as by a nut and bolt connection or the like. Proximity sensor 54 may embody a conventional proximity sensor (e.g., an inductive sensor, a capacitive sensor, a photoelectric sensor, etc.) configured to emit an electromagnetic field or a beam of electromagnetic radiation (e.g., infrared) and detect changes in the field or a return signal to determine a position of drill head 26. For example, as drill head 26 is moved to the position of proximity sensor 54, target plate 80 may pass in front of proximity sensor 54 such that the electromagnetic field changes. Thus, proximity sensor 54 may detect target plate 80 when drill head 26 is at the position of proximity sensor 54. It is understood that proximity sensor 54 may be positioned to detect any part of drill head 26. For example, target plate 80 may be coupled to support structure 76 or drill head 26 and proximity sensor 54 may be positioned and aligned to detect target plate 80 on support structure 76, and/or drill head 26. In some embodiments, target plate 80 may be omitted such that proximity sensor 54 may be positioned and aligned to detect guide assemblies 78, support structure 76, and/or drill head 26 directly. Further, proximity sensor 54 may be any type of sensor for detecting when drill head 26 is at the position of the sensor.

Figure 5:
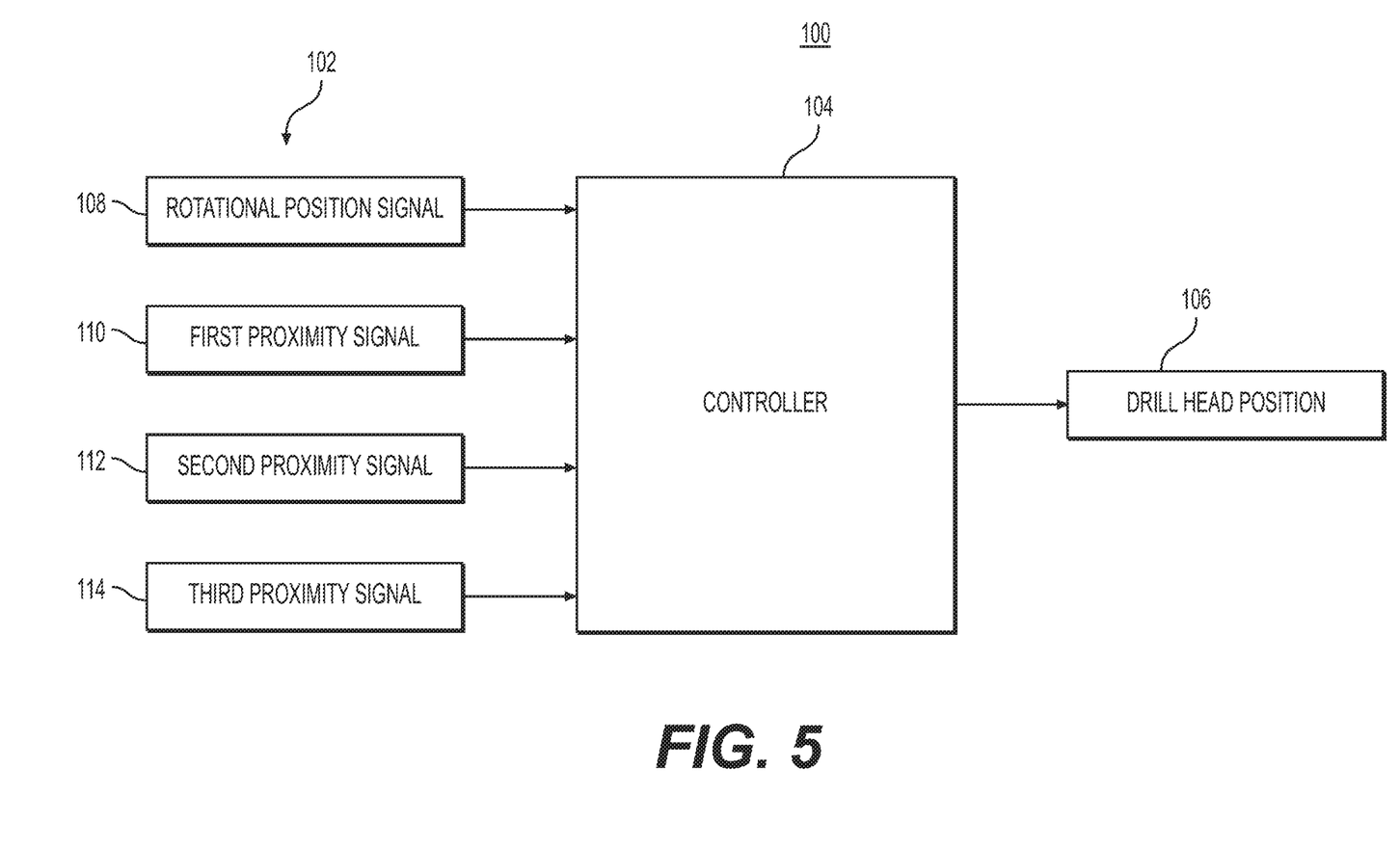
FIG. 5 illustrates a schematic view of a drill head position determination system of the drilling machine of FIG. 1.

FIG. 5 illustrates a schematic view of the drill head position determination system 100 of drilling machine 10 for operation and/or control of at least portions of drilling machine 10. Control system 100 may include inputs 102, controller 104, and an output 106. Inputs 102 may include signals from sheave sensor 52 and the proximity sensors 54a-54c. For example, inputs 102 may include rotational position signal 108, first proximity signal 110, second proximity signal 112, and third proximity signal 114. Output 106 may include, for example, a drill head position output.

Controller 104 may embody a single microprocessor or multiple microprocessors that may include means for determining a position of drill head 26. For example, controller 104 may include a memory (e.g., a non-volatile memory), a secondary storage device, a processor, such as a central processing unit or any other means for accomplishing a task consistent with the present disclosure. The memory or secondary storage device associated with controller 104 may store data and/or software routines that may assist controller 104 in performing its functions. Further, the memory or secondary storage device associated with controller 104 may also store data received from the various inputs 102 associated with drilling machine 10. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry.

Rotational position signal 108 may correspond to a rotational position measured by sheave sensor 52, as detailed above. For example, when sheave sensor 52 is a magnetic encoder sensor, controller 104 may receive signals indicating a measured change in a magnetic field as indexing element 72 (e.g., the magnet) rotates within encoder 66. Controller 104 may then determine a rotational position of sheave 48 (e.g., of sheave shaft 62) based on the measured change in magnetic field. Controller 104 may convert a measurement of sheave sensor 48 to a rotational location of sheave 48 (e.g., sheave shaft 62) based on one or more pre-programmed relationships. Controller 104 may also derive rotational position information from other sources, including other sensors such as proximity switches, hall effect sensors, and/or other encoders.

First proximity signal 110 may correspond to a position of drill head 26 detected by first proximity sensor 54a. When first proximity sensor 54a is an inductive proximity sensor, controller 104 may receive signals indicating a detected change in an electromagnetic field when drill head 26 triggers first proximity sensor 54a. For example, first proximity sensor 54a may detect target plate 80 when drill head 26 is at first position 56. The first proximity signal 110 may be directed to controller 104, which may use the signal to determine a change in the field or signal and use this information to determine a position of drill head 26 when drill head 26 is at the first position 56. Controller 104 may likewise use second proximity signal 112 and third proximity signal 114 to determine a change in the field or signal and use this information to determine a position of drill head 26 when drill head 26 is at the second position 58 and third position 60, respectively. Controller 104 may also derive position information from other sources, including other sensors.

For output 106, controller 104 may use rotational position signal 108 and the first proximity signal 110, the second proximity signal 112, and/or the third proximity signal 114 to determine the drill head 26 position, as detailed below. Drill head position output 106 may include displaying the position of drill head 26 to an operator of drilling machine 10 via, for example, a display in operator cab 22 or to a remote operator. However, controller 104 may also use drill head position output 106 internally for automatically performing various functions of the drilling operation.

INDUSTRIAL APPLICABILITY

The disclosed aspects of drill head position determination system 100 of the present disclosure may be used in any drilling machine 10, such as a blasthole drilling machine, to determine a position of a drill head 26 on a mast 16.

Referring to FIGS. 2 and 5, controller 104 may determine a position of drill head 26 (e.g., position of drill head output 116) based on the rotational position signal 108 and the first, second, and/or third proximity signals 110, 112, 114. For example, controller 104 may determine a rotational position of sheave 48 (e.g., via sheave shaft 62) based on rotational position signal 108 from sheave sensor 52, as detailed above. Controller 104 may then determine the position of drill head 26 by using a stored lookup table that maps different position values of drill head 26 to corresponding values of rotational position of sheave 48. Thus, controller 104 may determine (via sheave sensor 52) a position of drill head 26 based on a measured rotational position of sheave 48.

As described above, cable 50 may slip or jump within sheave 48 as drill head 26 is moved along mast 16 such that the position of drill head 26 does not always correspond to the stored values of rotational position of sheave 48. To account for this, controller 104 may calibrate sheave sensor 52 when drill head 26 is at the position 56-60 of each proximity sensor 54a-54c. For example, controller 104 may calibrate the position values that correspond to the rotational position values of sheave 48 in the lookup table. To calibrate sheave sensor 48, controller 104 may store the position value for each position 56-60 of each proximity sensor 54a-54c, respectively, such that controller 104 may know an actual position of each proximity sensor 54a-54c. Thus, when a proximity sensor 54a-54c is triggered by drill head 26 (e.g., via target plate 80), controller 104 may determine that drill head 26 is at a respective position 56-60. When a proximity sensor 54a-54c is triggered, controller 104 may determine whether the position value of drill head 26 corresponding to the value of rotational position of sheave 48 stored in the lookup table is different than the stored position value for the triggered proximity sensor 54a-54c. If the position value corresponding to the rotational position value in the lookup table is different than the stored position value for the triggered proximity sensor 54a-54c, controller 104 may update the position value corresponding to the rotational position value to be the position value for the triggered proximity sensor 54a-54c. Controller 104 may then update the rest of the position values corresponding to the rotational position values in the lookup table accordingly. Thus, calibrating sheave sensor 52 means controller 104 updates the position values corresponding to the rotational position values in the lookup table based on the respective position 56-60 of the proximity sensor 54a-54c when drill head 26 is at a respective position 56-60 of the proximity sensor 54a-54c.

Drill head position determination system 100 may help to ensure a more accurate determination of the position of drill head 26. For example, the plurality of proximity sensors 54a-54c may calibrate sheave sensor 52 based on the known position of each proximity sensor 54a-54c. Calibrating sheave sensor 52 in such a way may help to correct inconsistencies between the position values of drill head 26 that correspond to the rotational position values for sheave 48 due to, for example, slippage or jumping of cable 50 within sheaves 48. Further, controller 104 having correct position information of drill head 26 may enable an automatic drilling operation.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. For example, sheave sensor 52 may be any type of sensor for determining a rotational position of sheave 48. Further, while three proximity sensors 54 were described, any number of proximity sensors 54 may be used each located at any position on mast 16. It is intended that the specification and examples be considered as exemplary only, with a true scope and spirit of the invention being indicated by the following claims.

What is claimed is:
1. A drill motor position determination system, comprising:
a mast;
a drill motor movably attached to the mast, the drill motor configured to rotate a drill string;
a drill drive assembly configured to move the drill motor up and down along a length of the mast, the drill drive assembly including:
at least one sheave; and
a cable system wound about the at least one sheave;
a sheave sensor operatively coupled to the at least one sheave and configured to measure a rotational position of the at least one sheave;
at least one proximity sensor located at a position on the mast and configured to detect when the drill motor is at the position on the mast; and
a controller configured to:
determine a position of the drill motor based on the measured rotational position of the at least one sheave;
detect when the drill motor is at the position of the at least one proximity sensor; and
based on the detection when the drill motor is at the position of the at least one proximity sensor, calibrate the sheave sensor, wherein calibrating the sheave sensor includes the controller configured to:

determine whether the determined position of the drill motor is different than the position on the mast of the least one proximity sensor; and
based on the determination that the determined position of the drill motor is different than the position on the mast of the at least one proximity sensor, update the determined position of the drill motor to the position on the mast of the at least one proximity sensor.

2. The system of claim 1, wherein the at least one proximity sensor includes a plurality of proximity sensors each located at a different position on the mast.

3. The system of claim 2, wherein the plurality of proximity sensors includes a first proximity sensor at a first position corresponding to the drill motor position for engagement of a drill pipe of the drill string secured by a deck wrench of the mast.

4. The system of claim 3, wherein the plurality of proximity sensors includes a second proximity sensor at a second position corresponding to when the drill motor is moved above a drill pipe rack of the mast.

5. The system of claim 4, wherein the plurality of proximity sensors includes a third proximity sensor at a third position corresponding to when a drill tool coupled to the drill string is completely out of a ground surface.

6. The system of claim 1, wherein the calibrating the sheave sensor includes the controller configured to:
update position values corresponding to the measured rotational position of the at least one sheave based on the position of the at least one proximity sensor.

7. The system of claim 1, wherein the controller is further configured to determine the position of the drill motor using a stored lookup table that maps different position values of the drill motor to corresponding values of rotational position of the at least one sheave.

8. A drill motor position determination system, comprising:
a mast;
a drill motor movably attached to the mast, the drill motor configured to rotate a drill string;
a drill drive assembly configured to move the drill motor up and down along a length of the mast, the drill drive assembly including:
at least one sheave; and
a cable system wound about the at least one sheave;
a sheave sensor operatively coupled to the at least one sheave and configured to measure a rotational position of the at least one sheave;
a plurality of proximity sensors each located at a different position on the mast and each configured to detect when the drill motor is at a respective position on the mast by:
emitting a field or a beam; and
detecting changes in the field or receiving a return signal; and
a controller configured to:
determine a position of the drill motor based on the measured rotational position of the at least one sheave;
detect when the drill motor is at the respective position of each of the plurality of proximity sensors; and
based on the detection when the drill motor is at the respective position of a respective one of the plurality of proximity sensors, calibrate the sheave sensor, wherein calibrating the sheave sensor includes the controller configured to:

determining whether the determined position of the drill motor is different than the respective position of the respective one of the plurality of proximity sensors; and
based on the determination that the determined position of the drill motor is different than the respective position of the respective one of the plurality of proximity sensors, updating the determined position of the drill motor to the respective position of the respective one of the plurality of proximity sensors.

9. The system of claim 8, wherein the plurality of proximity sensors includes a first proximity sensor at a position corresponding to the drill motor position for engagement of a drill pipe of the drill string secured by a deck wrench of the mast.

10. The system of claim 9, wherein the plurality of proximity sensors includes a second proximity sensor at a position corresponding to when the drill motor is moved beyond a drill pipe rack of the mast.

11. The system of claim 10, wherein the plurality of proximity sensors includes a third proximity sensor at a position corresponding to when a drill tool coupled to the drill string is completely out of a ground surface.

12. The system of claim 8, wherein the calibrating the sheave sensor includes the controller configured to:
update position values corresponding to the measured rotational position of the at least one sheave based on the position of each of the plurality of proximity sensors.

13. The system of claim 8, wherein the controller is further configured to determine the position of the drill motor using a stored lookup table that maps different position values of the drill motor to corresponding values of rotational position of the at least one sheave.

14. A method for determining a position of a drill motor, the method comprising:
measuring a rotational position of a sheave using a sheave sensor;
determining, by a controller, a position of the drill motor based on the measured rotational position of the sheave;
detecting a position of the drill motor using at least one proximity sensor located at a position on a mast;
detecting, by the controller, when the drill motor is at the position of the at least one proximity sensor; and
based on the detection when the drill motor is at the position of the at least one proximity sensor, calibrating, by the controller, the sheave sensor, wherein calibrating the sheave sensor includes:
determining whether the determined position of the drill motor is different than the position on the mast of the at least one proximity sensor; and
based on the determination that the determined position of the drill motor is different than the position on the mast of the at least one proximity sensor, updating the determined position of the drill motor to the position on the mast of the at least one proximity sensor.

15. The method of claim 14, wherein the at least one proximity sensor includes a plurality of proximity sensors each located at a different position on the mast.

16. The method of claim 15, wherein the plurality of proximity sensors includes a first proximity sensor at a position corresponding to the drill motor position for engagement of a drill pipe of a drill string secured by a deck wrench of the mast.

17. The method of claim 16, wherein the plurality of proximity sensors includes a second proximity sensor at a position corresponding to when the drill motor is moved beyond a drill pipe rack of the mast.

18. The method of claim 17, wherein the plurality of proximity sensors includes a third proximity sensor at a position corresponding to when a drill tool coupled to the drill string is completely out of a ground surface.

19. The method of claim 14, wherein the calibrating, by the controller, the sheave sensor includes:
    updating, by the controller, position values corresponding to the measured rotational position of the sheave based on the position of the at least one proximity sensor.

20. The method of claim 14, wherein determining a position of the drill motor based on the measured rotational position of the sheave includes: determining the position of the drill motor using a stored lookup table that maps different position values of the drill motor to corresponding values of rotational position of the sheave.

\* \* \* \* \*